(12) United States Patent
Kim et al.

(10) Patent No.: US 12,092,913 B2
(45) Date of Patent: Sep. 17, 2024

(54) LIGHT PATH CONTROL MEMBER, AND DISPLAY DEVICE INCLUDING SAME

(71) Applicant: LG Display Co., Ltd., Seoul (KR)

(72) Inventors: Hyunseung Kim, Paju-si (KR); Youngmin Oh, Paju-si (KR); Minhyung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/242,022

(22) Filed: Sep. 5, 2023

(65) Prior Publication Data
US 2024/0201528 A1    Jun. 20, 2024

(30) Foreign Application Priority Data
Dec. 15, 2022  (KR) .................. 10-2022-0175700

(51) Int. Cl.
*G02F 1/13*    (2006.01)
*G02B 5/30*    (2006.01)

(52) U.S. Cl.
CPC ......... *G02F 1/1323* (2013.01); *G02B 5/3033* (2013.01)

(58) Field of Classification Search
CPC .............. G02F 1/1323; G09G 2358/00; G09G 2320/068; H04N 2013/403
See application file for complete search history.

(56) References Cited

U.S. PATENT DOCUMENTS

| | | | |
|---|---|---|---|
| 2006/0221631 A1* | 10/2006 | Uehara | G02F 1/133606 362/600 |
| 2014/0232960 A1* | 8/2014 | Schwartz | B32B 3/30 349/12 |
| 2016/0154259 A1* | 6/2016 | Kim | H10K 50/85 349/33 |
| 2017/0261781 A1* | 9/2017 | Lee | G02F 1/1334 |
| 2022/0229320 A1* | 7/2022 | Dong | G02F 1/134309 |
| 2023/0176406 A1* | 6/2023 | Lee | G02F 1/167 359/296 |
| 2023/0185146 A1* | 6/2023 | Mei | G02F 1/133531 349/88 |

FOREIGN PATENT DOCUMENTS

| | | |
|---|---|---|
| KR | 10-2021-0078000 A | 6/2021 |
| KR | 10-2021-0081786 A | 7/2021 |

* cited by examiner

Primary Examiner — Jonathan Y Jung
(74) Attorney, Agent, or Firm — POLSINELLI PC

(57) ABSTRACT

A light path control member according to an aspect includes a first substrate; a first electrode disposed on the first substrate; a light path control unit disposed on the first electrode; a second electrode disposed on the light path conversion unit; and a second substrate disposed on the second electrode, wherein the light path control unit includes a light transmission part and a light path conversion part around the light transmission part, the light transmission part includes first alignment materials, the light path conversion part includes second alignment materials, an alignment direction of the second alignment materials change according to a voltage applied to at least one of the first electrode or the second electrode.

16 Claims, 20 Drawing Sheets

LIGHT PATH CONTROL MEMBER, AND DISPLAY DEVICE INCLUDING SAME

CROSS REFERENCE TO RELATED APPLICATION

The present application claims priority to Korean Patent Application No. 10-2022-0175700, filed Dec. 15, 2022, the entire contents of which is incorporated herein for all purposes by this reference.

BACKGROUND

Field of the Disclosure

The disclosure relates to a light path control member and a display device including the same.

Description of the Related Art

A light-shielding film shields transmission of light from a light source, and is attached to a front surface of a display panel of a mobile phone, a notebook, a tablet PC, a vehicle navigation device, a vehicle touch, etc. The light-shielding film adjusts a viewing angle of light according to an incident angle of light to express a clear image quality at a viewing angle needed by a user when the display is outputting a screen to the user.

In addition, the light-shielding film may be used for the window of a vehicle, building or the like to partially shield outside light to prevent glare, or to prevent the inside from being visible from the outside.

That is, the light-shielding film may be a light path conversion member that controls the movement path of light, blocks light in a specific direction, and transmits light in a specific direction. Accordingly, the transmission angle of light is controlled by the light-shielding film to selectively control the user's viewing angle.

SUMMARY

An object to be solved by the disclosure is to provide a light path control member capable of switching between a first mode (share mode) and a second mode (privacy mode).

Another object to be achieved by the disclosure is to provide a display device including a light path control member capable of switching between a first mode (share mode) and a second mode (privacy mode).

The technical object to be achieved by the disclosure is not limited to the above-mentioned technical object, and other technical objects not mentioned may be clearly understood by those skilled in the art from the description below.

To achieve the above object, a light path control member according to an aspect includes a first substrate; a first electrode disposed on the first substrate; a light path control unit disposed on the first electrode; a second electrode disposed on the light path control unit; and a second substrate disposed on the second electrode, wherein the light path control unit includes a light transmission part and a light path conversion part around the light transmission part, the light transmission part includes first alignment materials, the light path conversion part includes second alignment materials, the second alignment materials change an alignment direction according to voltage application.

To achieve the above object, a light path control member according to another aspect includes a first substrate; a first electrode disposed on the first substrate; a light path control unit disposed on the first electrode; a second electrode disposed on the light path control unit; and a second substrate disposed on the second electrode, wherein the light path control unit includes a first area and a second area around the first area, the first area includes a light transmission part, the second area includes the light transmission part and a light path conversion part around the light transmission part, the light transmission part includes first alignment materials, the light path conversion part includes second alignment materials, the second alignment materials change an alignment direction according to voltage application.

To achieve another object above, a display device according to an aspect includes a light path control member; a first polarization film on the light path control member; and a display panel on the first polarization film, wherein the light path control member includes a first substrate, a first electrode disposed on the first substrate, a light path control unit disposed on the first electrode, a second electrode disposed on the light path control unit, and a second substrate disposed on the second electrode, wherein the light path control unit includes a light transmission part and a light path conversion part around the light transmission part, the light transmission part includes first alignment materials, the light path conversion part includes second alignment materials, the second alignment materials change an alignment direction according to voltage application.

Other details of embodiments are included in detailed descriptions and drawings.

According to the light path control member and the display device according to embodiments, switching between the first mode (share mode) and the second mode (privacy mode) may be possible.

The effects of the embodiments are not restricted to the one set forth herein, and more various effects are included in the specification.

DETAILED DESCRIPTION

Figure 1:
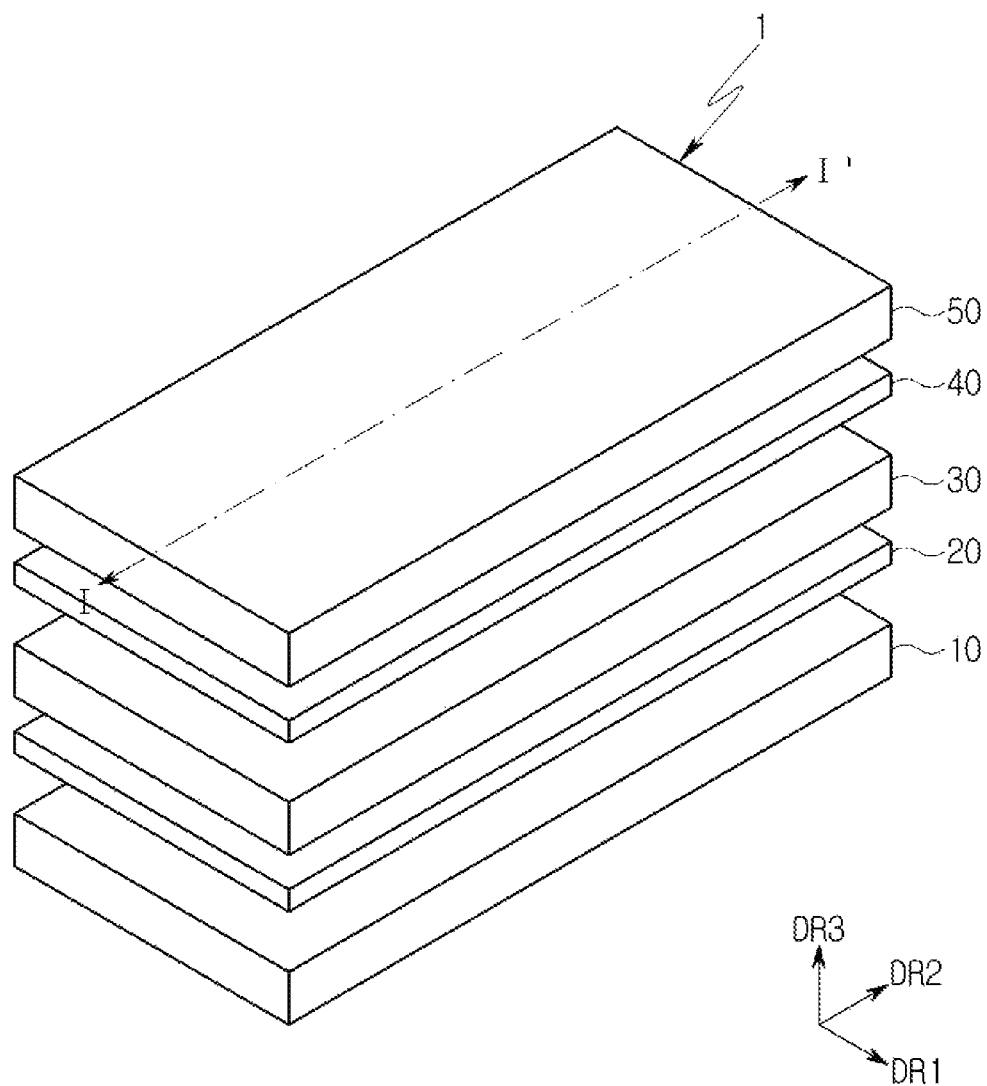
FIG. 1 is a perspective view of a light path control member according to an aspect.

The advantages and features of the disclosure and ways to achieve them will be apparent by making reference to embodiments as described below in detail in conjunction with the accompanying drawings. However, the disclosure is not limited to the embodiments set forth below, but may be implemented in various forms. The following embodiments are provided only to completely disclose the disclosure and inform those skilled in the art of the scope of the disclosure, and the disclosure is defined only by the scope of the appended claims.

Cases where elements or layers are referred to as being located "on" other elements or layers include all the cases where other layers or other elements are interposed directly on or between other elements. The same reference numerals refer to the same constituent elements throughout the specification. The shapes, sizes, ratios, angles, numbers, and the like, inscribed in the drawings to illustrate embodiments are illustrative only, and the disclosure is not limited to the illustrations in the drawings.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure.

Features of various embodiments of the disclosure may be partially or overall coupled to or combined with each other and may be variously inter-operated with each other and driven technically. The embodiments of the disclosure may be carried out independently from each other or may be carried out together in a co-dependent relationship.

Exemplary embodiments will hereinafter be described in detail with reference to the accompanying drawings.

Figure 2:
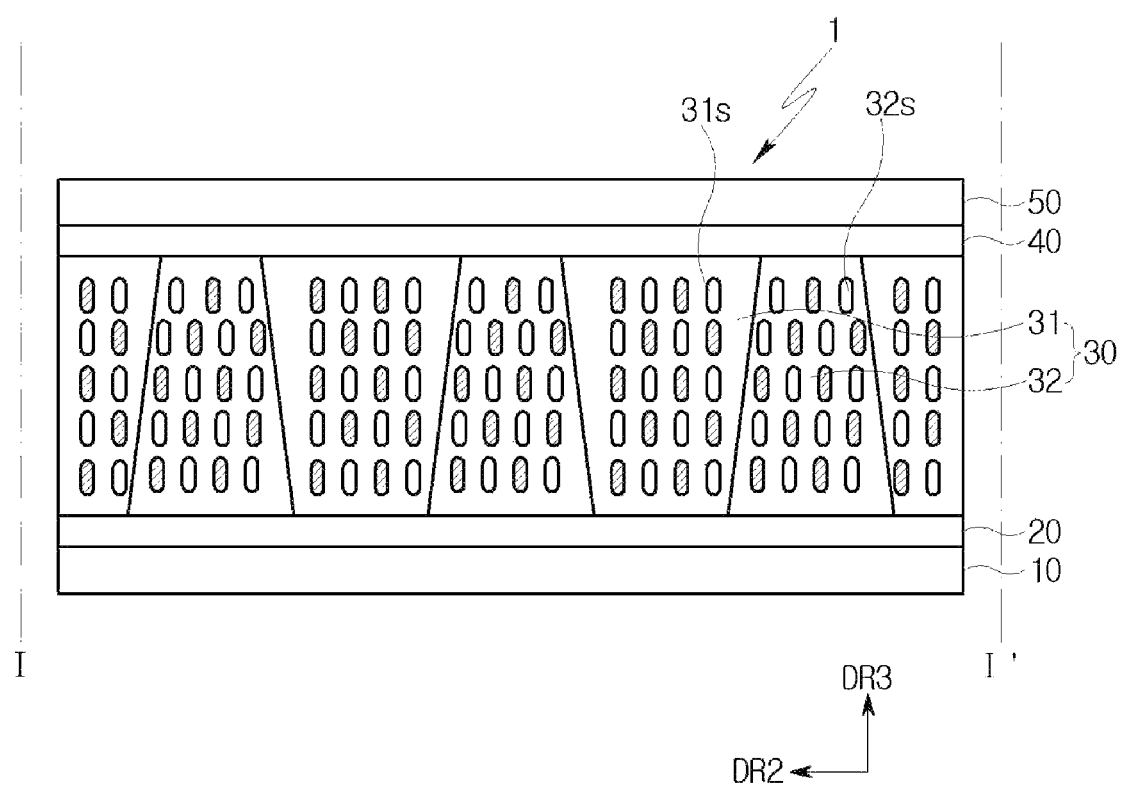
FIG. 2 is a cross-sectional view taken along the line I-I' in FIG. 1.
Figure 3:
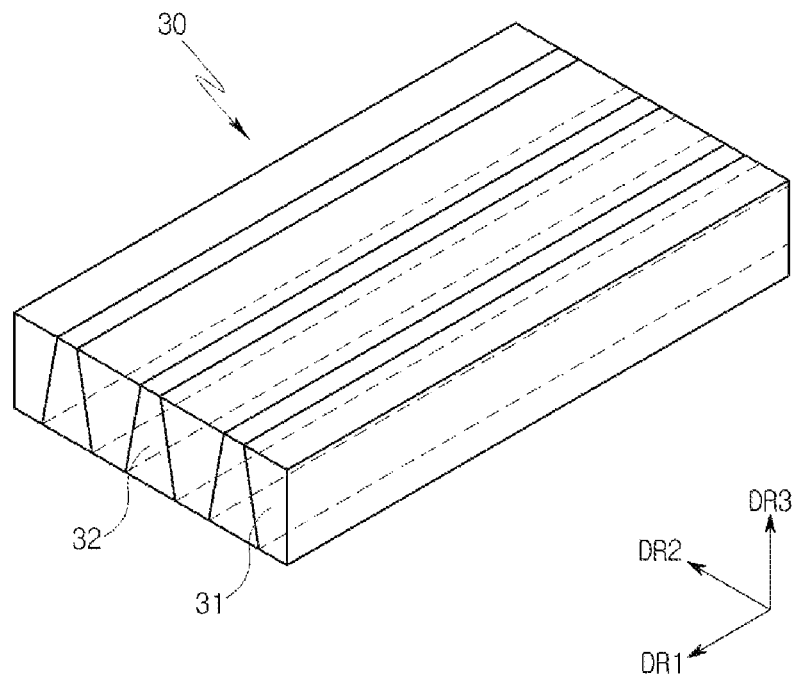
FIG. 3 is a perspective view illustrating a light path control unit in FIG. 2.
Figure 4:
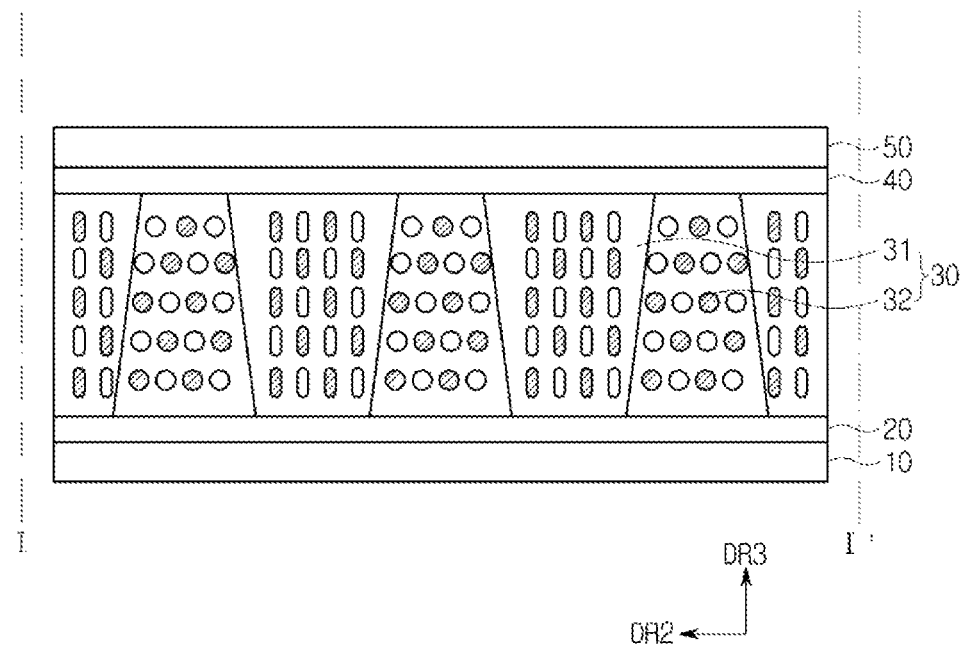
FIG. 4 is a cross-sectional view of a light path control member according to a second mode.
Figure 5:
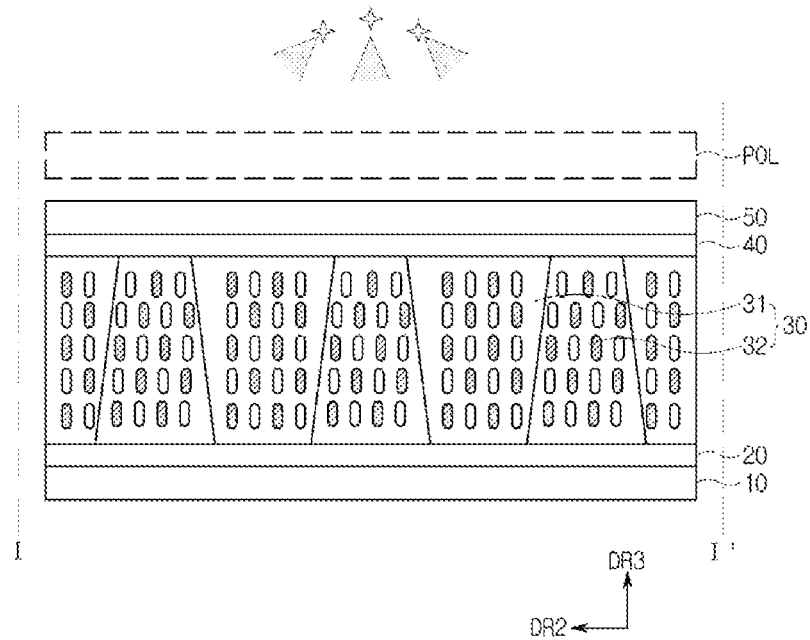
FIG. 5 is a schematic view illustrating a function of a light path control member in a first mode.
Figure 6:
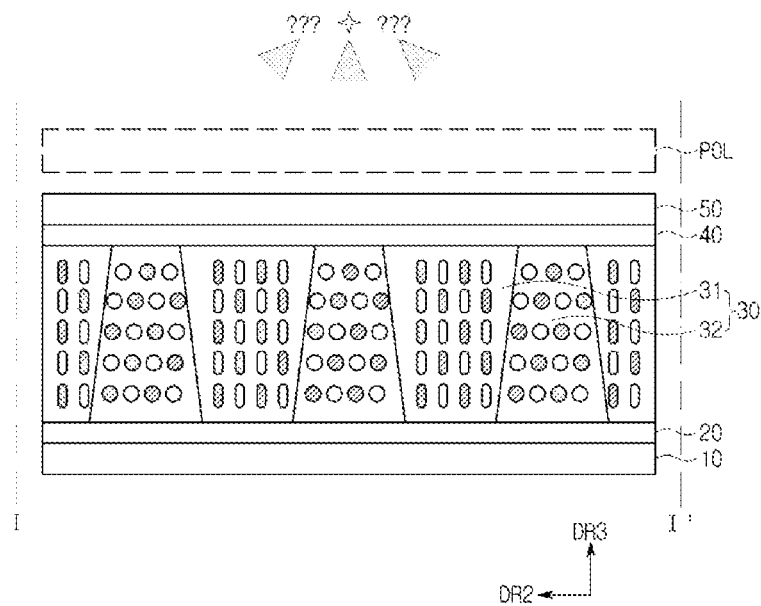
FIG. 6 is a schematic view illustrating a function of a light path control member in a second mode.
Figure 7:
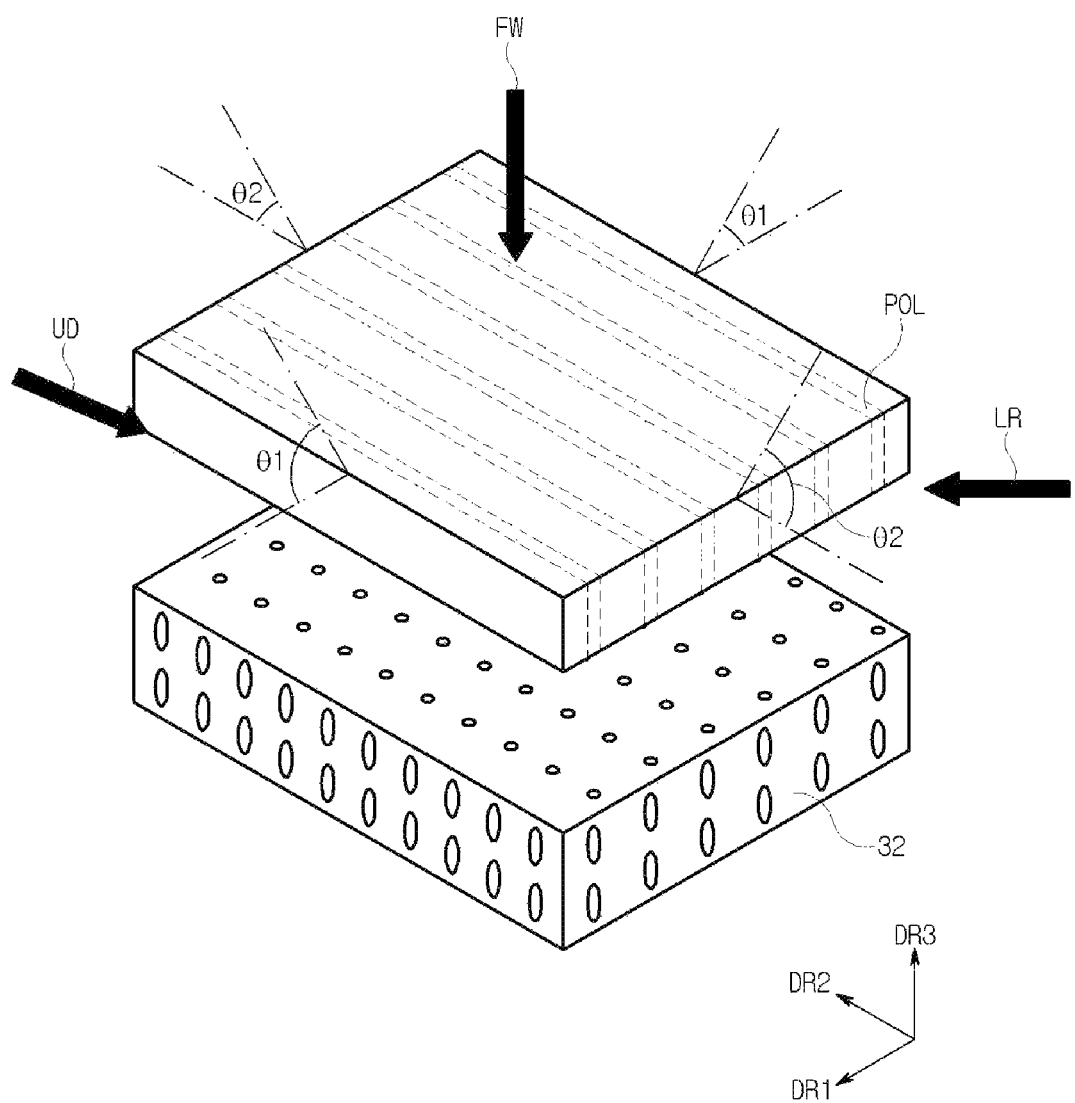
FIG. 7 is a schematic view illustrating a first polarization film and a light path conversion part in a first mode.
Figure 8:
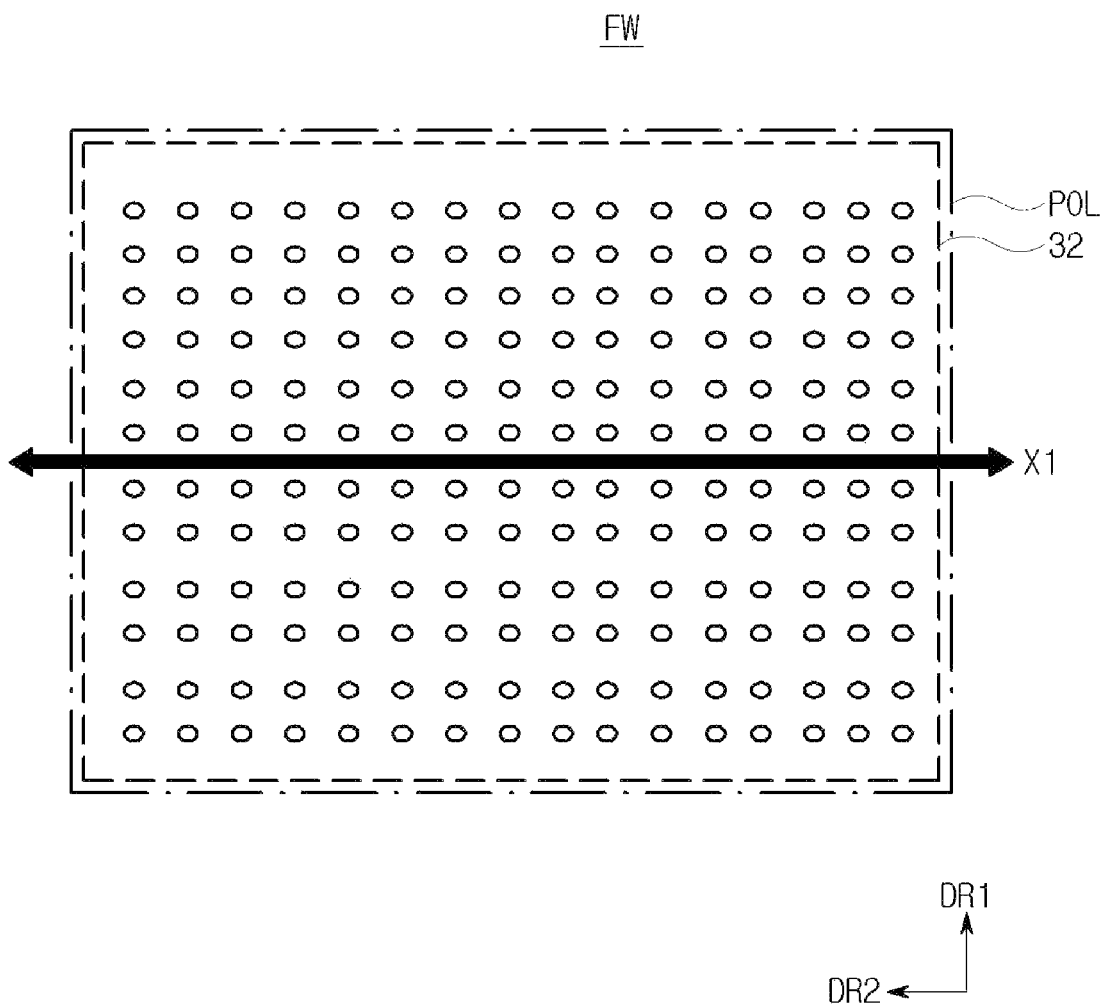
FIG. 8 is a plan view illustrating the first polarization film and the light path conversion part in FIG. 7 viewed from a front direction.
Figure 9:
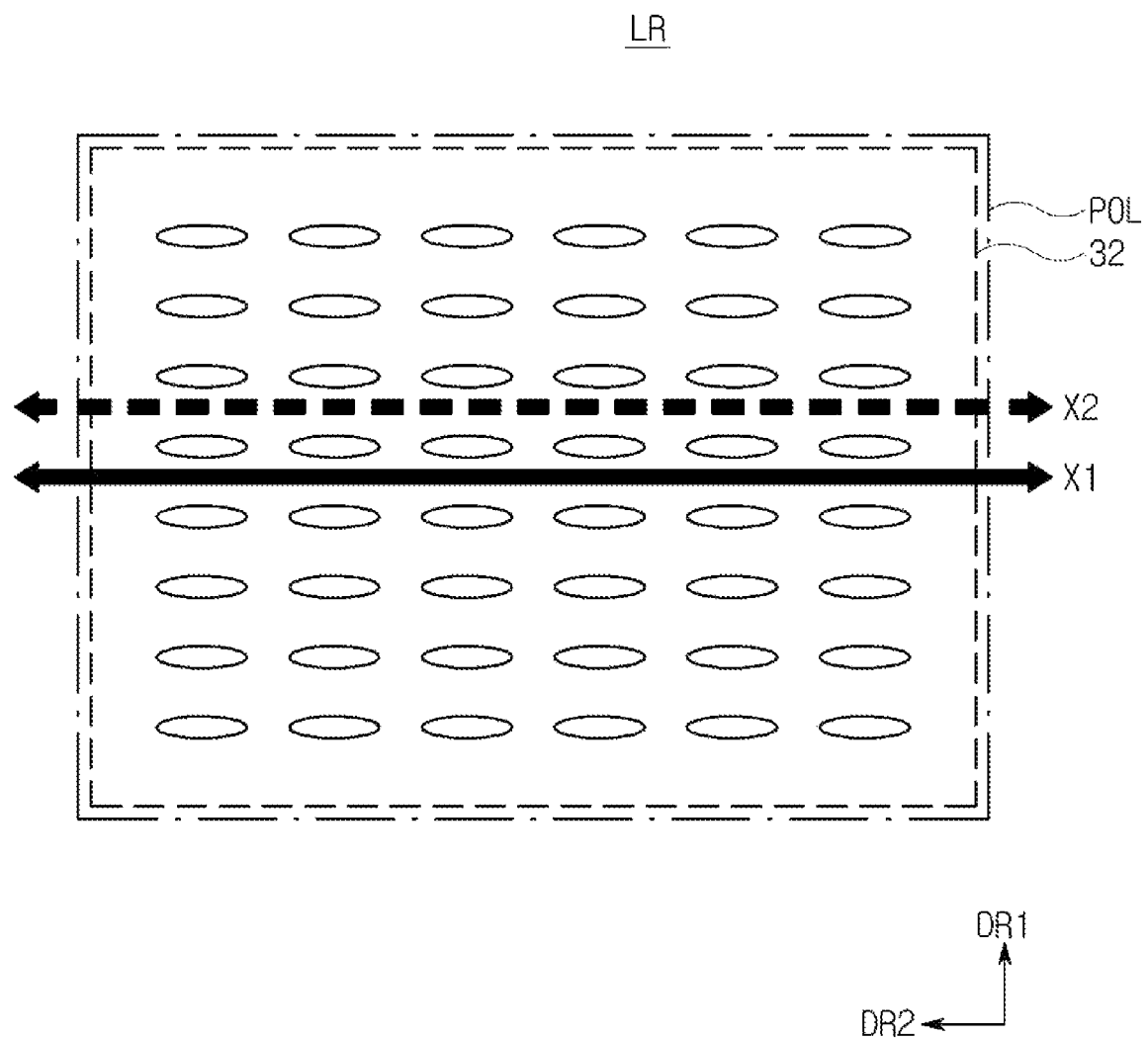
FIG. 9 is a plan view illustrating the first polarization film and the light path conversion part in FIG. 7 viewed from a horizontal direction.
Figure 10:
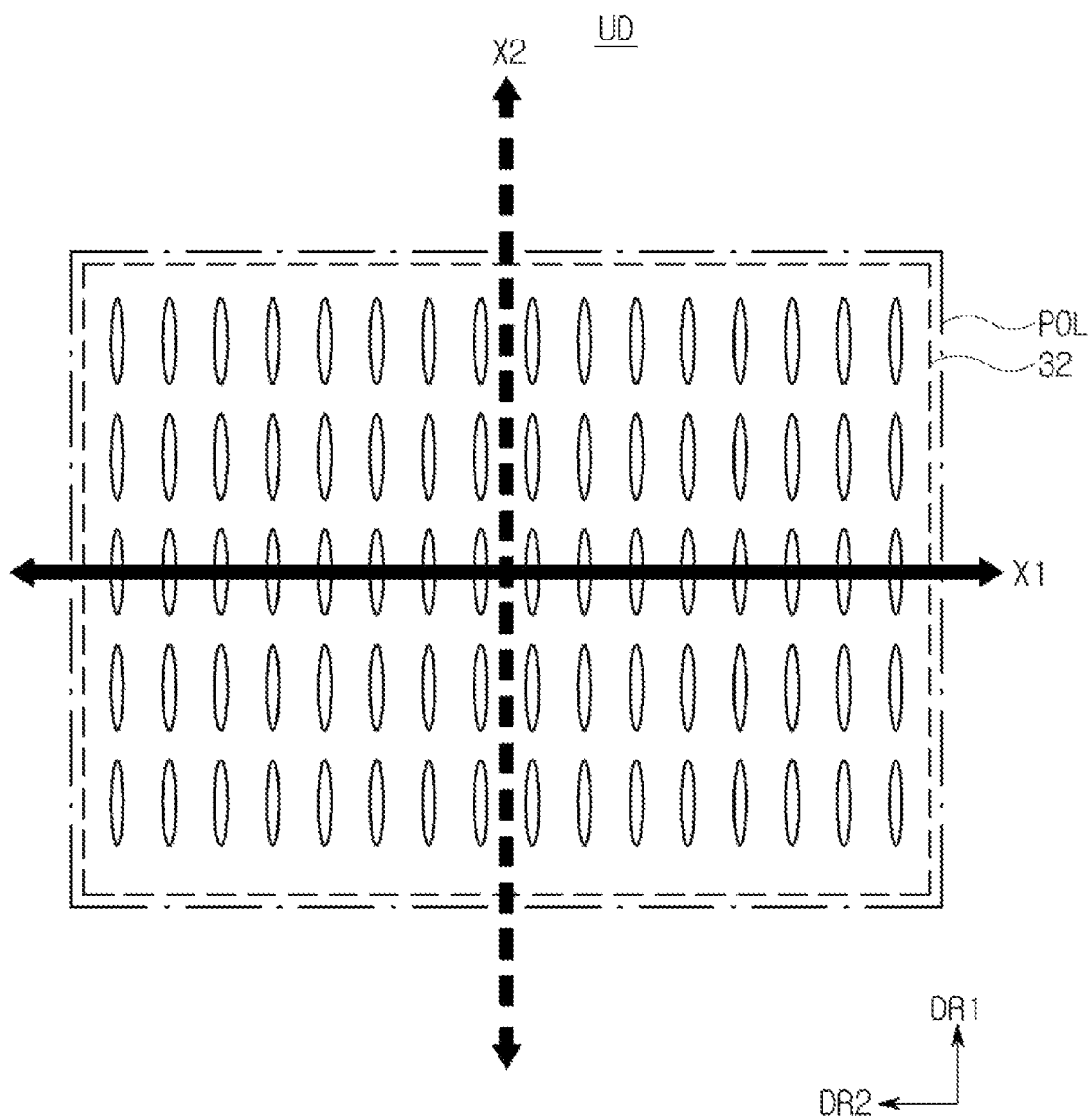
FIG. 10 is a plan view illustrating the first polarization film and the light path conversion part in FIG. 7 viewed from a vertical direction.
Figure 11:
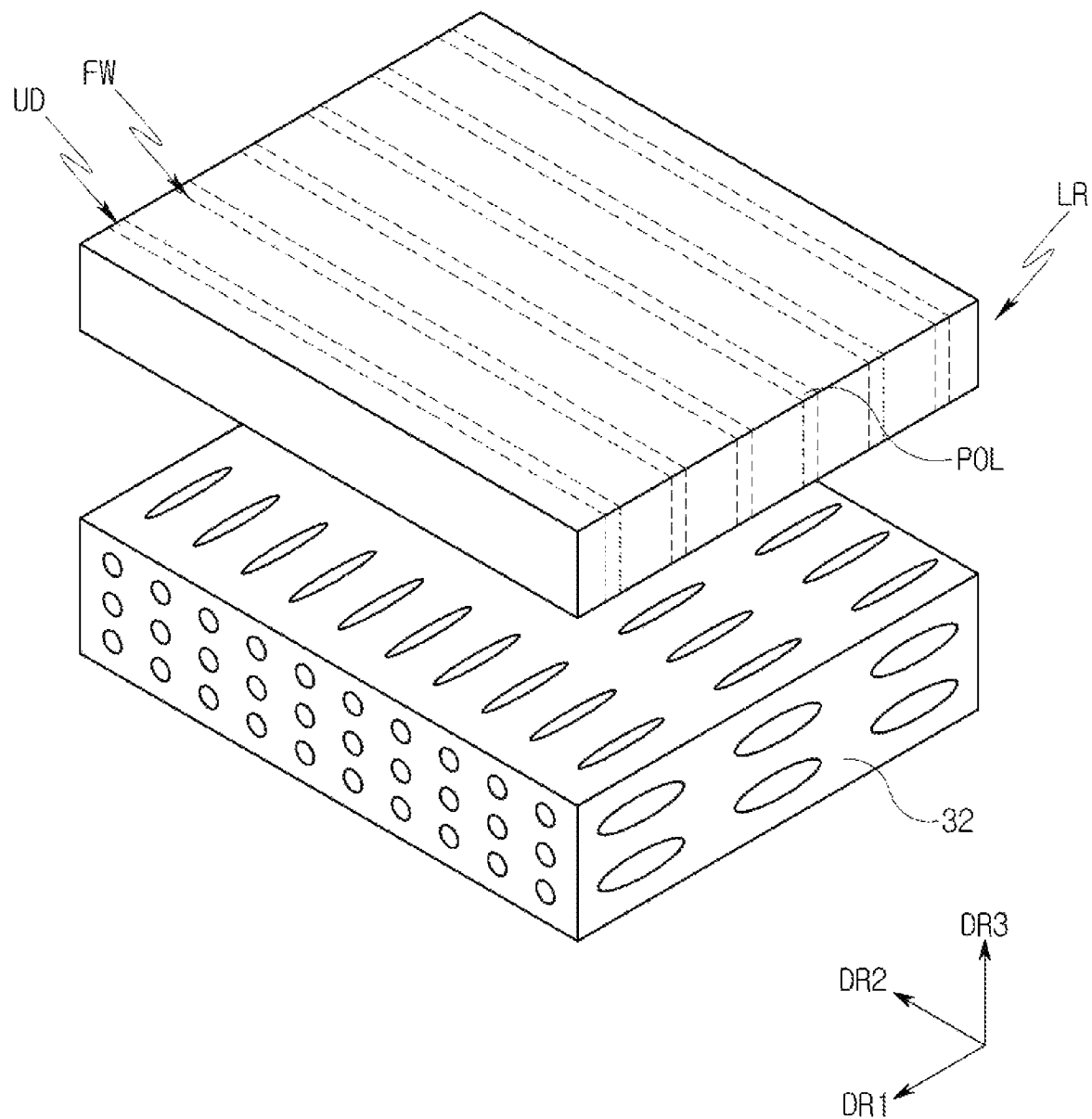
FIG. 11 is a schematic view illustrating a first polarization film and a light path conversion part in a second mode.
Figure 12:
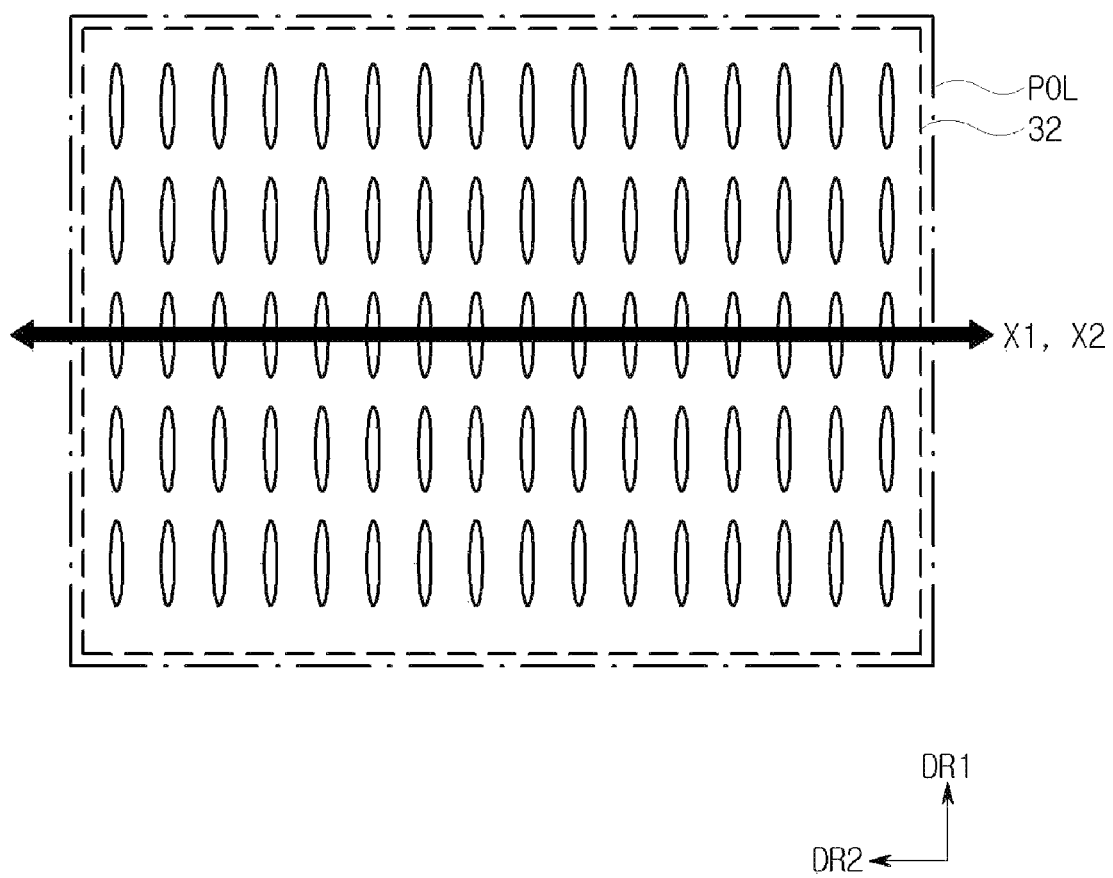
FIG. 12 is a plan view illustrating the first polarization film and the light path conversion part in FIG. 11 viewed from a front direction, a horizontal direction, and a vertical direction, respectively.

FIG. 1 is a perspective view of a light path control member according to an aspect of the disclosure. FIG. 2 is a cross-sectional view taken along the line I-I' in FIG. 1. FIG. 3 is a perspective view illustrating a light path control unit in FIG. 2. FIG. 4 is a cross-sectional view of a light path control member according to a second mode. FIG. 5 is a schematic view illustrating a function of a light path control member in a first mode. FIG. 6 is a schematic view illustrating a function of a light path control member in a second mode. FIG. 7 is a schematic view illustrating a first polarization film and a light path conversion part in a first mode. FIG. 8 is a plan view illustrating the first polarization film and the light path conversion part in FIG. 7 viewed from a front direction. FIG. 9 is a plan view illustrating the first polarization film and the light path conversion part in FIG. 7 viewed from a horizontal direction. FIG. 10 is a plan view illustrating the first polarization film and the light path conversion part in FIG. 7 viewed from a vertical direction. FIG. 11 is a schematic view illustrating a first polarization film and a light path conversion part in a second mode. FIG. 12 is a plan view illustrating the first polarization film and the light path conversion part in FIG. 11 viewed from a front direction, a horizontal direction, and a vertical direction, respectively.

Referring to FIGS. 1 to 12, a light path control member 1 according to an aspect may include a first substrate 10, a first electrode 20 on the first substrate 10, a light path control unit 30 on the first electrode 20, a second electrode 40 on the light path control unit 30, and a second substrate 50 on the second electrode 40. The light path control unit 30 may be disposed between the first electrode 20 and the second electrode 40.

The first substrate 10 may support the first electrode 20. The first substrate 10 may be rigid or flexible.

Also, the first substrate 10 may be transparent. For example, the first substrate 10 may include a transparent substrate capable of transmitting light.

The first substrate 10 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which are only examples and the first substrate is not limited thereto.

The first substrate 10 may be a flexible substrate having flexible characteristics.

In some cases, the first substrate 10 may be a curved or bent substrate. That is, the light path control member including the first substrate 10 may also be formed to have flexible, curved, or bended characteristics. For this reason, the light path control member according to an aspect may be changed into various designs.

The first substrate 10 may have a thickness of about 1 mm or less.

The first electrode 20 may be disposed on one surface of the first substrate 10. More specifically, the first electrode 20 may be disposed on the upper surface of the first substrate 10. That is, the first electrode 20 may be disposed between the first substrate 10 and the second substrate 50.

The first electrode 20 may include a transparent and electrically conductive material. For example, the first electrode 20 may include a metal oxide such as indium tin oxide, indium zinc oxide, copper oxide, tin oxide, zinc oxide, titanium oxide.

The light transmittance of the first electrode 20 may be about 80% or more. More specifically, the first electrode 20 may be disposed on the entire surface of one surface of the first substrate 10. That is, the first electrode 20 may be disposed as a surface electrode on the first substrate 10.

The first electrode 20 may have a thickness of about 10 nm to about 50 nm.

Alternatively, the first electrode 20 may include various metals to implement a low resistance. For example, the first electrode 20 may include at least one metal selected from chromium (Cr), nickel (Ni), copper (Cu), aluminum (Al), silver (Ag), molybdenum (Mo), gold (Au), titanium (Ti), and alloys thereof.

The first electrode 20 may be disposed on the entire surface of one surface of the first substrate 10. More specifically, the first electrode 20 may be disposed as a surface electrode on one surface of the first substrate 10. However, an aspect is not limited thereto, and the first electrode 20 may be formed of a plurality of patterned electrodes having a predetermined pattern.

The second substrate 50 may be disposed on the first substrate 10. The second substrate 50 may face the first substrate 10.

The second substrate 50 may include a material capable of transmitting light. The second substrate 50 may include a transparent material. The second substrate 50 may include the same or similar material as the first substrate 10 described above.

For example, the second substrate 50 may include glass, plastic, or a flexible polymer film. For example, the flexible polymer films may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which are only examples and the material is not necessarily limited thereto.

The second substrate 50 may be a flexible substrate having flexible characteristics.

In some cases, the second substrate 50 may be a curved or bent substrate. That is, the light path control member including the second substrate 50 may also be formed to have a flexible, curved or bent characteristic. For this reason, the light path control member according to an aspect may be changed into various designs.

The second substrate 50 may have a thickness of about 1 mm or less.

The second electrode 40 may be disposed on one surface of the second substrate 50. More specifically, the second electrode 40 may be disposed on the lower surface of the second substrate 50. That is, the second electrode 40 may be disposed on a surface of the second substrate 50 facing the first substrate 10. Specifically, the second electrode 40 may be disposed facing the first electrode 20 on the first substrate 10. Thus, the second electrode 40 may be disposed between the first electrode 20 and the second substrate 50.

The second electrode 40 may include a transparent and electrically conductive material. For example, the second electrode 40 may include a metal oxide such as indium-tin oxide, indium-zinc oxide, cooper oxide, tin oxide, zinc oxide, titanium oxide.

The light transmittance of the second electrode 40 may be about 80% or more. More specifically, the second electrode 40 may be disposed on the entire surface of the lower surface of the second substrate 50. That is, the second electrode 40 may be disposed as a surface electrode on the second substrate 50.

The second electrode 40 may have a thickness of about 10 nm to about 50 nm.

Alternatively, the second electrode 40 may include various metals to implement a low resistance. For example, the second electrode 40 may include at least one metal selected from chromium (Cr), nickel (Ni), copper (Cu), aluminum (Al), silver (Ag), molybdenum (Mo), gold (Au), titanium (Ti), and alloys thereof.

The second electrode 40 may be disposed on the entire surface of the lower surface of the second substrate 50. More specifically, the second electrode 40 may be disposed as a surface electrode on the lower surface of the second substrate 50. However, an aspect is not limited thereto, and the second electrode 40 may be formed of a plurality of patterned electrodes having a predetermined pattern.

The light path control unit 30 may be disposed between the first substrate 10 and the second substrate 50. More specifically, the light path control unit 30 may be disposed between the first electrode 20 and the second electrode 40.

The light path control unit 30 may include a light transmission part 31 and a light path conversion part 32. The light transmission part 31 may include first alignment materials 31s. The light path conversion part 32 may include second alignment materials 32s.

In one aspect, light is provided to each light transmission part 31 and each light path conversion part 32 from a bottom, and the light passing through the light transmission part 31 and the light path conversion part 32 may be provided to a polarization film (POL in FIG. 5) that is disposed above the light transmission part 31 and the light path conversion part 32.

A first mode of the light path control unit 30 corresponds to a state in which voltage is not applied to the electrodes 20 and 40, and a second mode of the light path control unit 30 corresponds to a state in which voltage is applied to the electrodes 20 and 40.

In the first mode, the light provided to the polarization film POL from the light path control unit 30 is blocked when viewed by the user in the vertical direction, and may become visible when viewed by the user in the front direction and the horizontal direction. That is, in the first mode, the light provided to the polarization film POL from each of the light transmission part 31 and the light path conversion part 32 is blocked when viewed by the user in the vertical direction, and may become visible when viewed from the front direction and the horizontal direction. For example, as illustrated in FIG. 7, the front direction FW is a direction in which the display device 1 is viewed in a third direction DR3. The vertical direction UD in FIG. 7 is a direction in which the display device 1 is viewed with a predetermined viewing angle θ1 between the first direction DR1 and a direction between the first and third directions DR1 and DR3. The horizontal direction LR in FIG. 7 is a direction in which the display device 1 is viewed with a predetermined viewing angle θ2 between the second direction DR2 and a direction between the second and third directions DR2 and DR3.

In the second mode, the light provided to the polarization film POL from the light path control unit 30 is blocked when viewed by the user in the vertical and horizontal directions, and may become visible when viewed by the user in the front direction FW.

More specifically, in the second mode, the light provided to the polarization film POL from each of the light transmission part 31 and the light path conversion part 32 may be blocked when viewed by the user in the vertical direction UD.

Furthermore, when viewed by the user in the front direction FW, the light provided to the polarization film POL from the light path conversion part 32 is absorbed by the polarization film POL and blocked, but the light provided to the polarization film POL from the light transmission part 31 may become visible to the user.

Still furthermore, when viewed by the user in the horizontal direction LR, the light provided to the polarization film POL from the light path conversion part 32 is absorbed by the polarization film POL and blocked, but the light proceeding from the light transmission part 31 to the polarization film POL passes through the adjacent light path conversion part 32 and proceeds to the polarization film POL, so that the light is absorbed by the polarization film POL and blocked.

For example, as illustrated in FIGS. 3, 4, 5, and 6, the cross-sectional shape of the light path conversion part 32 may be a trapezoidal shape. That is, in the light path conversion part 32, the width of the upper surface may be smaller than the width of the lower surface.

The light transmission part 31 may include an opening. A cross-sectional shape of the opening may be the same as that of the light path conversion part 32. The cross-sectional shape of the opening is not limited thereto, and may be an inverted trapezoidal shape, a rectangular shape, a square shape, or other polygonal shape.

The opening may be formed from a surface of the light transmission part 31.

Side surfaces of the light path conversion part 32 may directly contact the adjacent light transmission part 31. An upper surface of the light path conversion part 32 may contact the second electrode 40 and a lower surface of the light path conversion part 32 may contact the first electrode 20. The lower surface of the light transmission part 31 may contact the first electrode 20 and the upper surface of the light transmission part 31 may contact the second substrate 50. The light transmission part 31 may contact a side surface of the second electrode 40.

As illustrated in FIG. 3, a plurality of light path conversion part 32 may be provided, and each of the plurality of light path conversion parts 32 extends along the first direction DR1 and may be spaced apart from each other in the second direction DR2.

First, the first mode will be described.

As described above, in the first mode, the light provided to the polarization film POL from each of the light transmission part 31 and the light path conversion part 32 may be blocked when viewed by the user in the vertical direction UD in FIG. 7, for example, the direction between the third direction DR3 and the first direction DR1, and may become visible when viewed by the user in the front direction FW in FIG. 7, for example, the third direction DR3, and the horizontal direction LR in FIG. 7, for example, a direction between the third direction DR3 and the second direction DR2.

As illustrated in FIG. 2, in the first mode, the arrangement direction of the first alignment materials 31s of the light transmission part 31 and the arrangement direction of the second alignment materials 32s of the light path conversion part 32 may be identical to each other.

In the first mode, the alignment direction of the first alignment materials 31s of the light transmission part 31 may correspond to a direction of the thickness (e.g., the third direction DR3), and the alignment direction of the second alignment materials 32s of the light path conversion part 32 may be in the direction corresponding to the thickness (e.g., the third direction DR3).

As illustrated in FIG. 4, in the second mode, the alignment direction of the first alignment materials 31s of the light transmission part 31 may be in the direction corresponding to the thickness (e.g., the third direction DR3), and the alignment direction of the second alignment materials 32s of the light path conversion part 32 may be the first direction DR1. That is, when a voltage is applied to the electrodes 20 and 40, the alignment direction of the second alignment material 32s may change from the third direction DR3 to the first direction DR1. On the other hand, the alignment direction of the first alignment materials 31s may be maintained in the third direction DR3 regardless of whether or not voltage is applied to the electrodes 20 and 40. In this case, the alignment direction permits light to pass unimpeded. For example, the alignment direction of the light path conversion part 32 can permit more light incident to the second substrate 50 through the light path control member 1 and block more light incident to the first substrate 10 through the light path control member 1. In one aspect, the first alignment material 31s and the second alignment material 32s may include the same material. Each of the first alignment material 31s and the second alignment material 32s may include liquid crystal molecules and dye molecules capable of forming an absorption axis. The dye molecules may form a second absorption axis, for example axis X2 in FIG. 8, which will be described below. The liquid crystal molecules and the dye molecules may be combined with each other to form respective alignment materials. However, as described above, since the alignment direction of the first alignment materials 31s should be maintained in the third direction DR3 regardless of switching between the first mode and the second mode, the first alignment materials 31s should be cured. On the other hand, since the alignment direction of the second alignment materials 32s needs to be changed according to the switching of the first mode and the second mode, the second alignment materials 32s may be flexible and not cured. That is, the curing degree of the first alignment materials 31s may be greater than the curing degree of the second alignment materials 32s.

FIGS. 7, 8, 9, and 10 illustrate a relationship between the light path conversion part 32 and the polarization film POL in the first mode. FIGS. 11 and 12 illustrate a relationship between the light path conversion part 32 and the polarization film POL in the second mode.

Referring to FIG. 7, the polarization film POL may be disposed on the light path conversion part 32. The polarization film POL may have the same configuration as the first polarization film 300 in FIG. 23.

As illustrated in FIG. 7, in the first mode, as described above, the alignment direction of the second alignment materials 32s of the light path conversion part 32 may be the third direction DR3.

Referring to FIG. 8, when the light path control member is viewed by the user from the front direction FW, the light provided to the polarization film POL from the light path conversion part 32 may pass through the polarization film POL.

Referring to FIG. 9, when viewed by the user from the horizontal direction LR, the light provided to the polarization film POL from the light path conversion part 32 may pass through the polarization film POL. Hereinafter, the absorption axis of the polarization film POL is referred to as a first absorption axis X1, and the absorption axis of the second alignment materials 32s of the light path conversion part 32 is referred to as a second absorption axis X2. In FIG. 8, since the first absorption axis X1 and the second absorption axis X2 each extend in the second direction DR2, when viewed by the user from the horizontal directions LR, the light provided from the light path conversion part 32 to the polarization film POL may pass through the polarization film POL.

As illustrated in FIG. 10, when viewed by the user in the vertical direction UD, the light provided to the polarization film POL from the light path conversion part 32 may be absorbed by the polarization film POL and blocked. In FIG. 9, the first absorption axis X1 and the second absorption axis X2 may cross each other. For example, the first absorption axis X1 may extend in the second direction DR2, and the second absorption axis X2 may extend in the first direction DR1. The first absorption axis X1 and the second absorption axis X2 may be orthogonal to each other. Due to the first absorption axis X1 and the second absorption axis X2 being orthogonal, when viewed by the user in the vertical direction UD, the light provided from the light path conversion part 32 to the polarization film POL may be absorbed by the polarization film POL and blocked.

As illustrated in FIG. 11, in the second mode, as described above, the alignment direction of the second alignment materials 32s of the light path conversion part 32 may be the first direction DR1.

As illustrated in FIG. 12, when viewed by the user from the front direction FW, the horizontal direction LR, and the vertical direction UD, the light provided from the light path conversion part 32 to the polarization film POL may be absorbed by the polarization film POL and blocked. In FIG. 12, the first absorption axis X1 and the second absorption axis X2 may cross each other. For example, the first absorption axis X1 may extend in the second direction DR2, and the second absorption axis X2 may extend in the first direction DR1. The first absorption axis X1 and the second absorption axis X2 may be orthogonal to each other. As a result, when viewed by the user in the front direction FW, the horizontal direction LR, and the vertical direction UD, the light provided to the polarization film POL from the light path conversion part 32 may be absorbed by the polarization film POL and blocked.

Figure 13A:
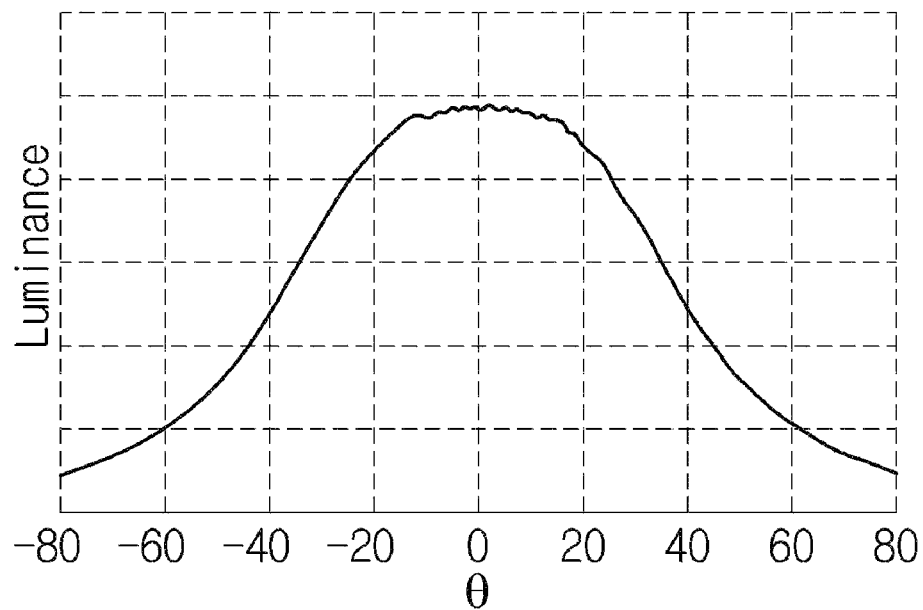
FIG. 13A is a graph illustrating an intensity of emitted light according to a horizontal viewing angles in a first mode.
Figure 13B:
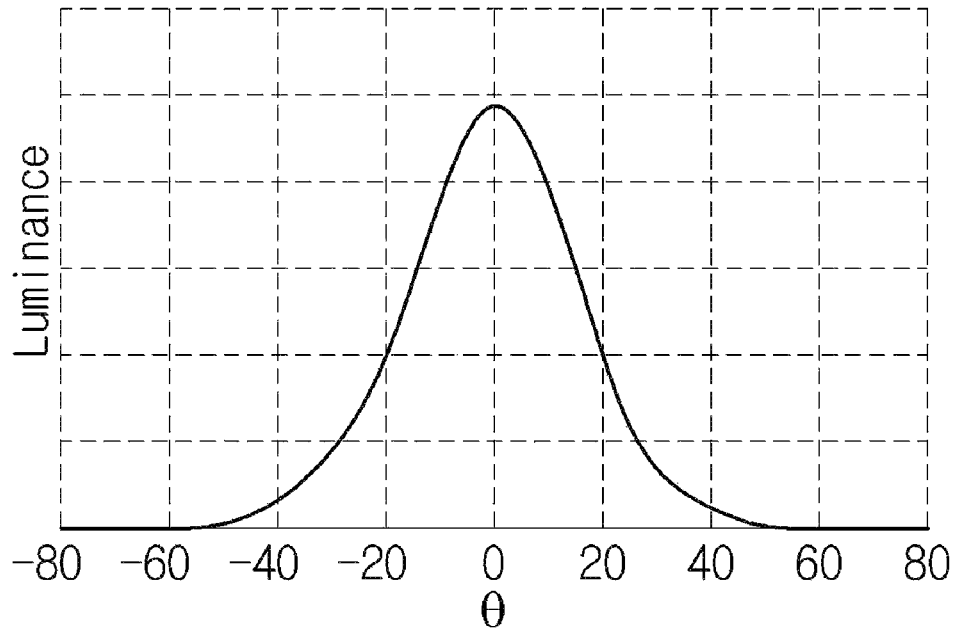
FIG. 13B is a graph illustrating an intensity of emitted light according to a vertical viewing angle in a first mode.
Figure 13C:
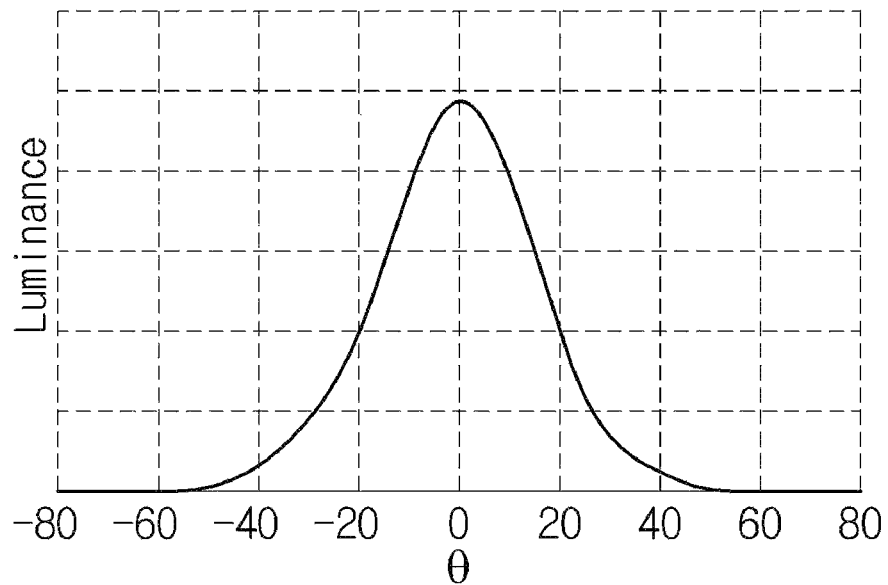
FIG. 13C is a graph illustrating an intensity of emitted light according to a horizontal viewing angle in a second mode.
Figure 13D:
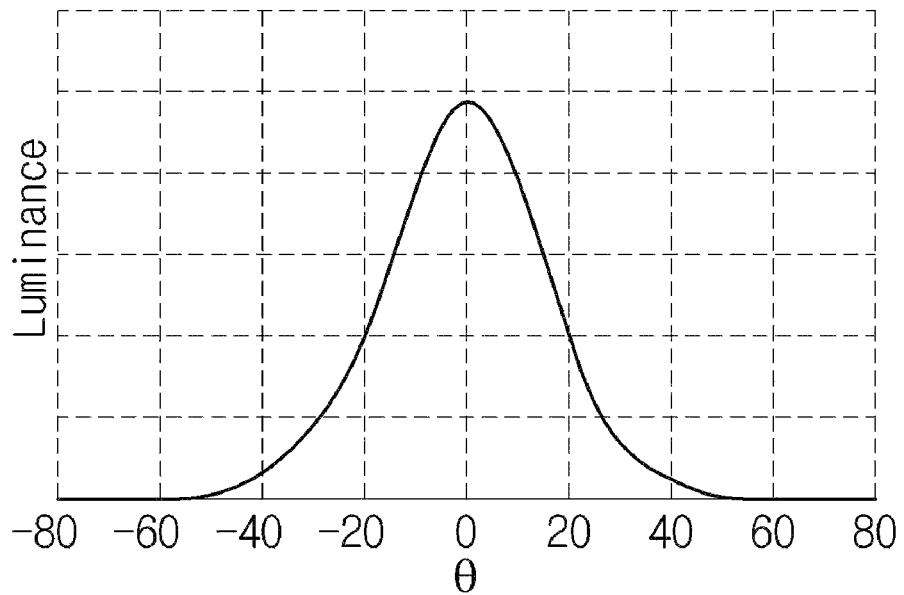
FIG. 13D is a graph illustrating an intensity of emitted light according to a vertical viewing angle in a second mode.

FIG. 13A is a graph illustrating an intensity of emitted light according to a horizontal viewing angle in a first mode. FIG. 13B is a graph illustrating an intensity of emitted light according to a vertical viewing angle in a first mode. FIG. 13C is a graph illustrating an intensity of emitted light according to a horizontal viewing angle in a second mode. FIG. 13D is a graph illustrating an intensity of emitted light according to a vertical viewing angle in a second mode.

As illustrated in FIGS. 13A, 13B, 13C, and 13D, in each of the first mode and the second mode, in the case of the vertical viewing angle, when viewed by the user in the vertical direction UD, the light provided is absorbed by the polarization film POL and may cause the viewing angle to be very narrow in each of the light transmission part 31 and the light path conversion part 32.

Furthermore, in the first mode, in the case of the horizontal viewing angle, when viewed by the user in the horizontal direction LR, the light provided to the polarization film POL from the light path control unit 30 passes through the polarization film POL and may cause the viewing angle to be widened in each of the light transmission part 31 and the light path conversion part 32.

On the other hand, in the second mode, in the case of the horizontal viewing angle, when viewed by the user in the horizontal direction LR, the light provided is absorbed by the polarization film POL and may cause the viewing angle to be very narrow in each of the light transmission part 31 and the light path conversion part 32.

Hereinafter, a method for manufacturing the light path control member 1 according to an aspect will be described.

Figure 14:
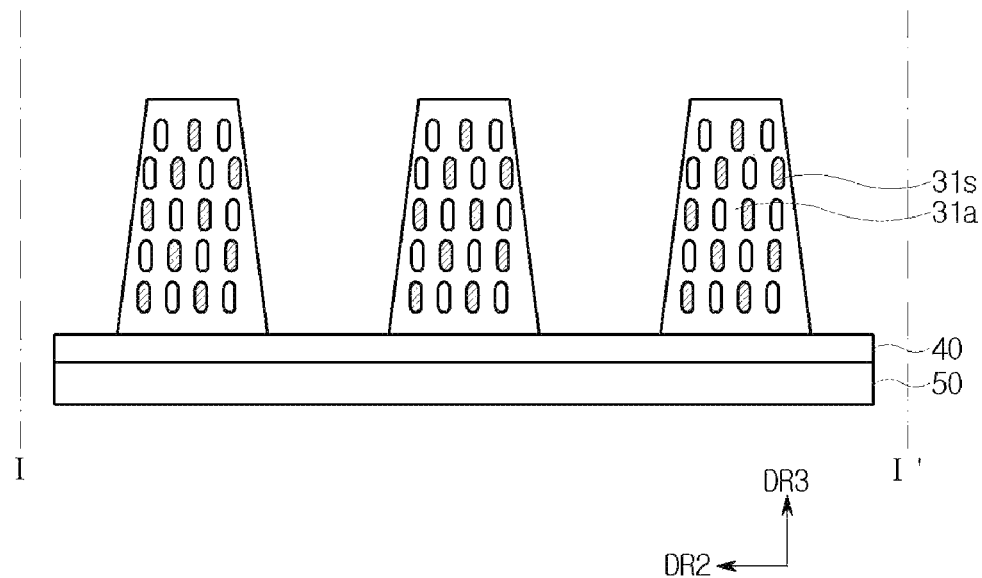
FIGS. 14 to 16 are cross-sectional views for respective processes illustrating a method for manufacturing a light path control member according to an aspect.
Figure 15:
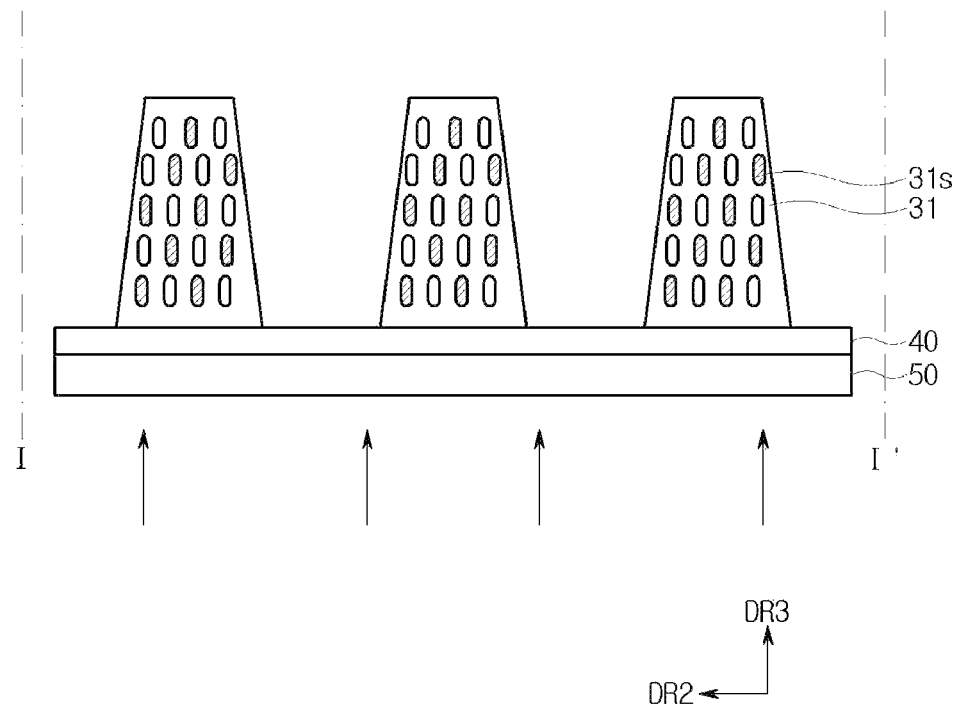
Figure 16:
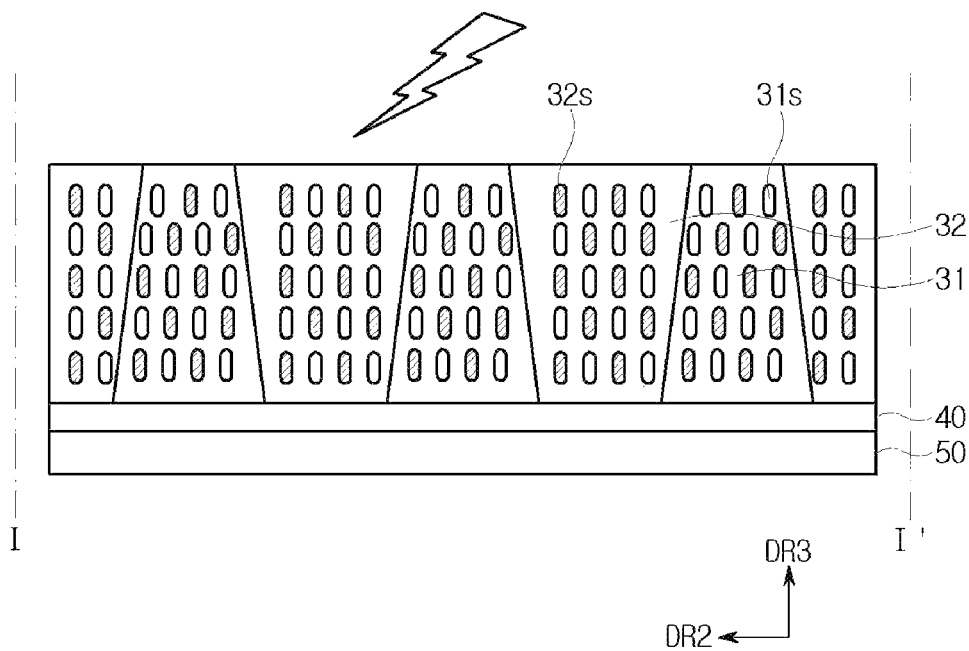

FIGS. 14, 15, and 16 are cross-sectional views for respective processes illustrating a method for manufacturing a light path control member according to an aspect of the disclosure. Referring to FIGS. 14, 15, and 16, FIGS. 1, 2, 3, and 4 described above may also be referenced in connection with describing the manufacturing process of the light path control member.

First, as illustrated in FIG. 14, after disposing the second electrode 40 on the second substrate 50, the light transmission part 31a is formed on the second electrode 40. The light transmission part 31a may include first alignment materials 31s. However, unlike the light transmission part 31 in FIG. 2, the light transmission part 31a in FIG. 14 may be uncured.

Subsequently, as illustrated in FIG. 15, the light transmission part 31a disposed on the second electrode 40 is cured to form the light transmission part 31. The curing may include thermal curing or photocuring. As a result, the degree of curing of the light transmission part 31 may be greater than that of the light transmission part 31a.

Subsequently, as illustrated in FIG. 16, the light path conversion part 32 is formed around the light transmission part 31. The light path conversion part 32 may be disposed within an opening formed in the light transmission part 31. The light path conversion part 32 may include second alignment materials 32s. The first alignment materials 31s and the second alignment materials 32s may include the same material. However, the degree of curing of the first alignment materials 31s may be greater than that of the second alignment materials 32s.

Next, a light path control member according to another aspect of the disclosure will be described.

Figure 17:
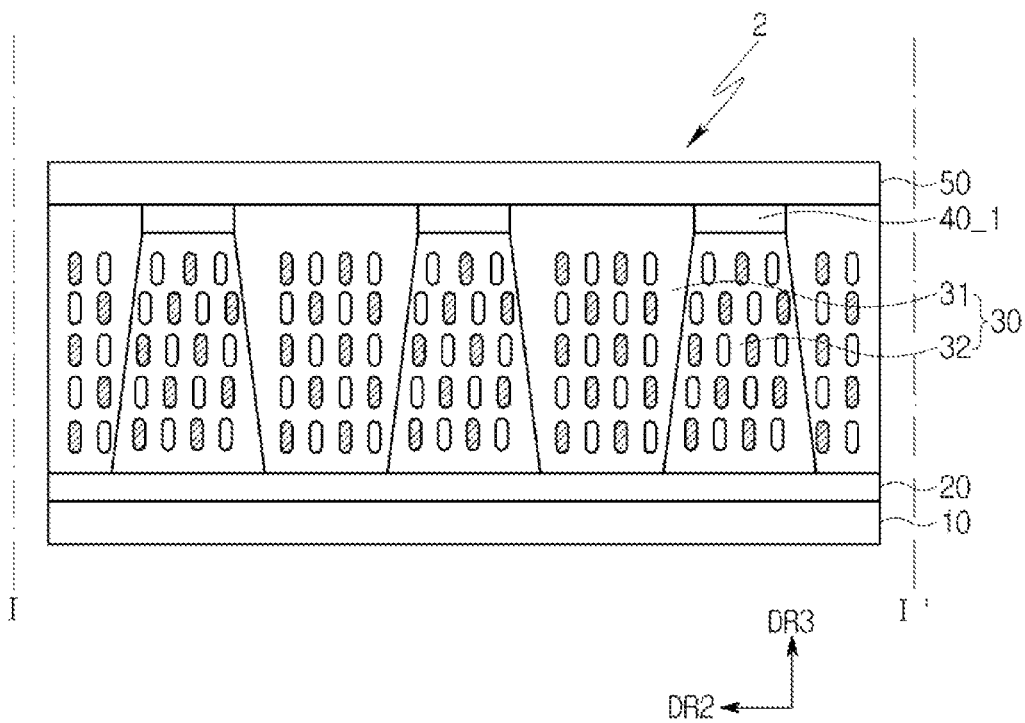
FIG. 17 is a cross-sectional view of a light path control member according to another aspect.

FIG. 17 is a cross-sectional view of a light path control member 2 according to another aspect of the disclosure.

Referring to FIG. 17, a second electrode 40_1 of a light path control member 2 according to the present aspect is different from the light path control member 1 in FIG. 2. For example, the light path control member 2 includes a plurality of patterns.

More specifically, the plurality of patterns may be spaced apart from each other and disposed along the second direction DR2. Each of the plurality of patterns may overlap the light path conversion part 32 in the thickness direction.

Other descriptions have been described above with reference to FIG. 2, so duplicative descriptions thereof will be omitted.

Figure 18:
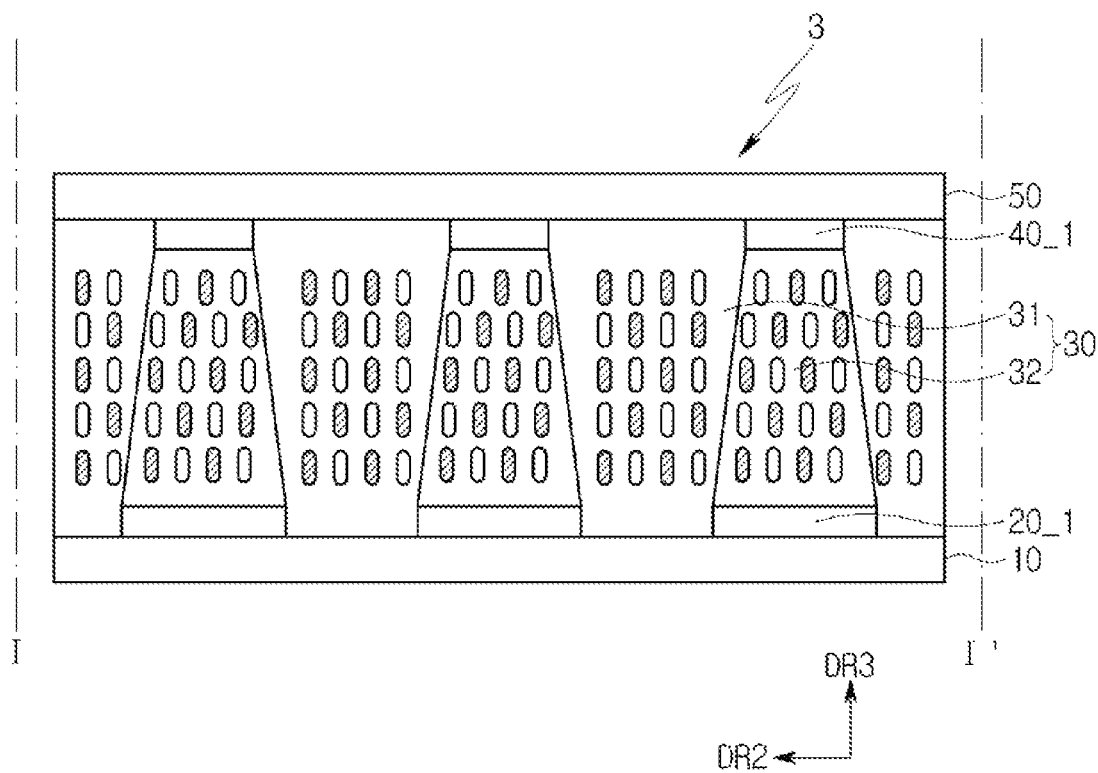
FIG. 18 is a cross-sectional view of a light path control member according to still another aspect.

FIG. 18 is a cross-sectional view of a light path control member 3 according to another aspect of the disclosure.

Referring to FIG. 18, a light path control member 3 according to the present aspect of the disclosure includes a first electrode 20_1 that is different from the light path control member 2 of FIG. 17.

More specifically, the plurality of patterns of the first electrode 20_1 may be spaced apart from each other and disposed along the second direction DR2. Each of the plurality of patterns may overlap the light path conversion part 32 in the thickness direction.

The cross-sectional shape of the light path conversion part 32 of the light path control member 3 illustrated in FIG. 18 is a trapezoidal shape where the width of the lower surface is greater than the width of the upper surface. In this case, the width of the pattern of the first electrode 20_1 in the second direction DR2 may be greater than the width of the pattern of the second electrode 40_1 in the second direction DR2.

Other descriptions have been described above with reference to FIGS. 2 and 17 and duplicative descriptions thereof will be omitted.

Figure 19:
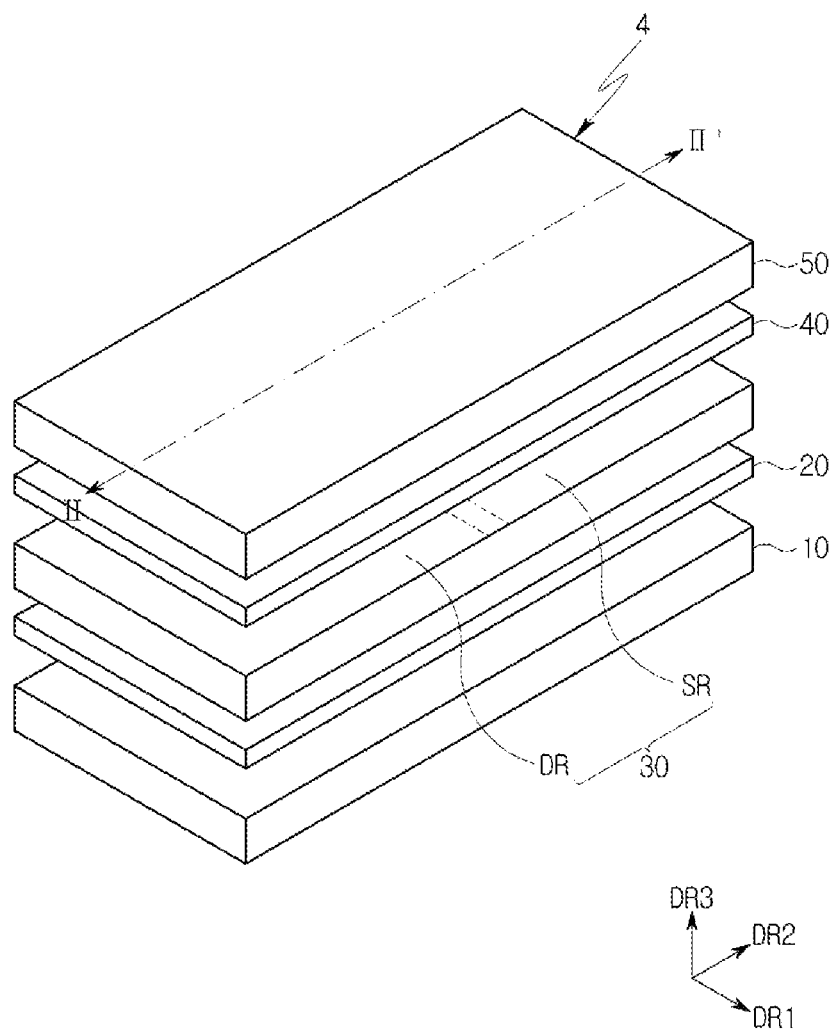
FIG. 19 is a perspective view of a light path control member according to still another aspect.
Figure 20:
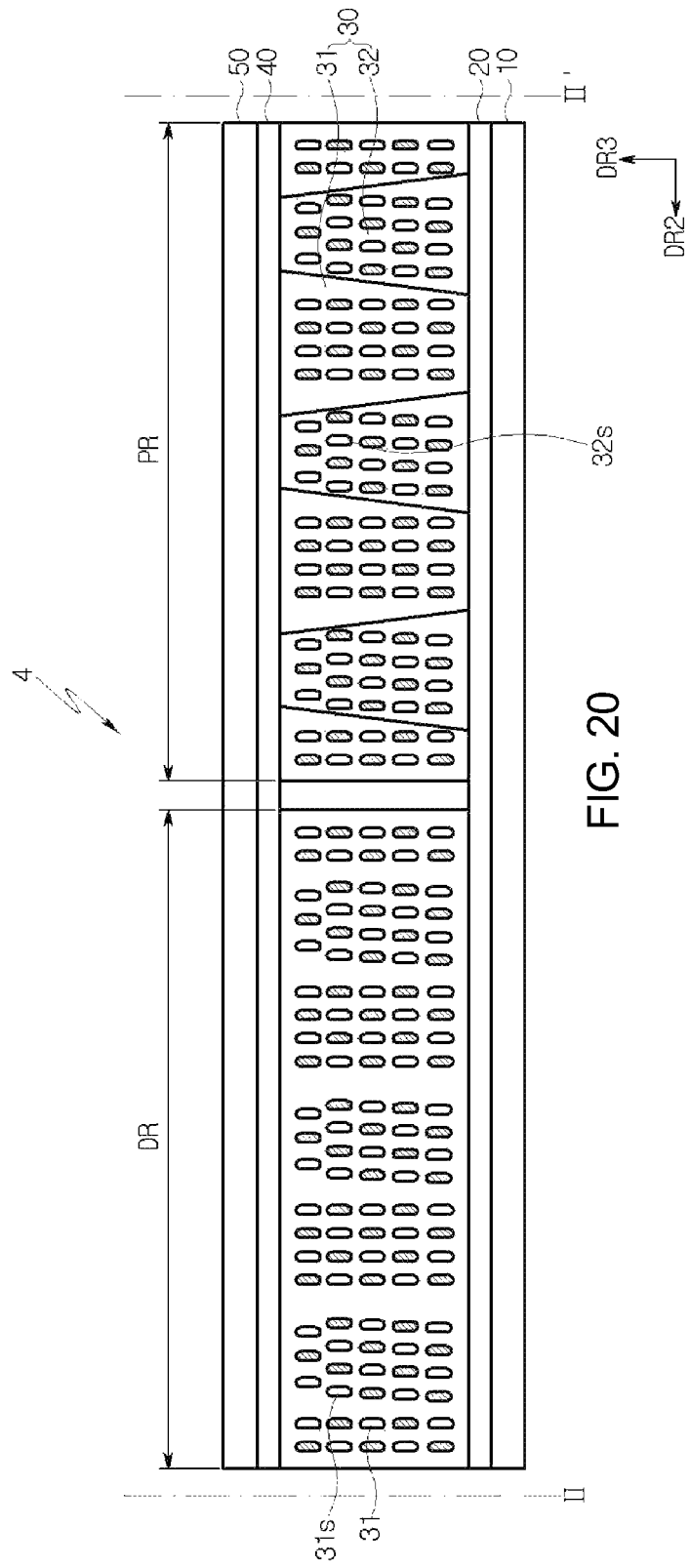
FIG. 20 is a cross-sectional view taken along line II-II' in FIG. 19.

FIG. 19 is a perspective view of a light path control member 4 according to another aspect of the disclosure. FIG. 20 is a cross-sectional view of the light path control member 4 taken along line II-II' in FIG. 19.

Referring to FIGS. 19 and 20, the light path control unit 30 of a light path control member 4 according to the present aspect may be different from the light path control unit 30 in FIGS. 1 and 2 in that light path control member 4 includes a first area DR and a second area PR near the first area DR.

More specifically, the first area DR is an area that passes light in both directions, and the second area PR of the light path control member 4 can be blocked in at least one direction. As illustrated in FIGS. 19 and 20, the first area DR and the second area PR may be physically separated but are not limited thereto and may be integrally formed.

As illustrated in FIG. 20, the first substrate 10, the first electrode 20, the second electrode 40, and the second substrate 50 may be disposed across the first area DR and the second area PR. The second area PR may correspond to the light path control unit 30 described above with reference to FIGS. 1 to 4. That is, the second area PR may include the light transmission part 31 and the light path conversion part 32 described above with reference to FIGS. 1 to 4.

On the other hand, the first area DR may include only the light transmission part 31. The light transmission part 31 may include the cured first alignment materials 31s. When the first area DR is an area viewed from the front, the vertical viewing angle is blocked, but the horizontal viewing angles do not need to be blocked, so the light transmission part 31 may be formed of only the cured first alignment material 31s.

Other descriptions have been described above with reference to FIGS. 1 to 4 and duplicative descriptions thereof will be omitted.

Figure 21:
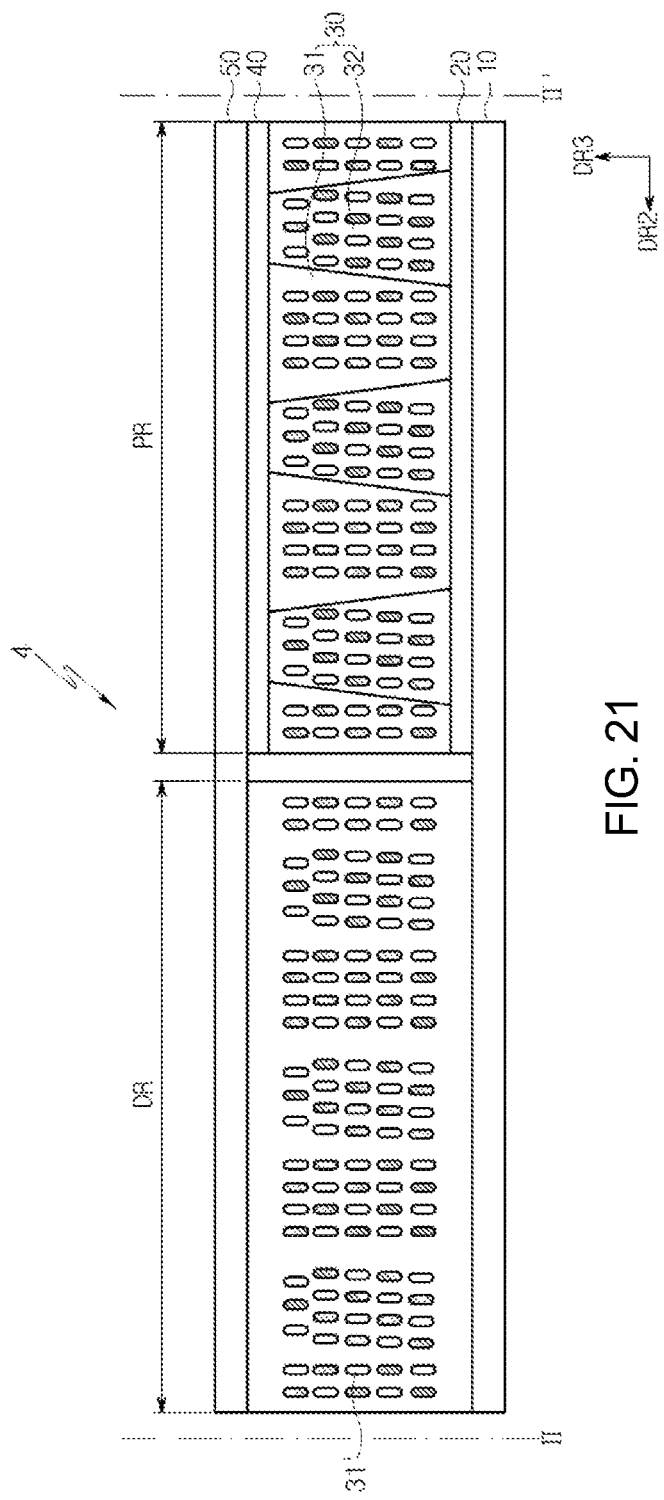
FIG. 21 is a cross-sectional view of a light path control member according to still another aspect.

FIG. 21 is a cross-sectional view of a light path control member 4 according to still another aspect of the disclosure.

Referring to FIG. 21, the light transmission part 31' of the first area DR of the light path control member 5 according to the present aspect is different from the light path control member 4 in FIG. 20 in that it is not cured.

More specifically, the light transmission part 31' may not be cured. The degree of curing of a light transmission part 31' may be smaller than that of the light transmission part 31 of the second area PR.

In some embodiments, the light transmission part 31' may be cured, but the degree of curing of the light transmission part 31' may be smaller than that of the light transmission part 31.

According to this aspect, the electrodes 20 and 40 may be disposed in the second area PR, respectively, but may not be disposed in the first area DR. Accordingly, in the second mode, when a voltage is applied to the electrodes 20 and 40, the light transmission part 31' in the first area DR is not affected by the electric field formed by the electrodes 20 and 40 in the second area PR. As a result, the first alignment materials 31s of the light transmission part 31' may have the alignment direction of the third direction DR3.

Other descriptions have been described above with reference to FIG. 20 and duplicative descriptions thereof will be omitted.

Figure 22:
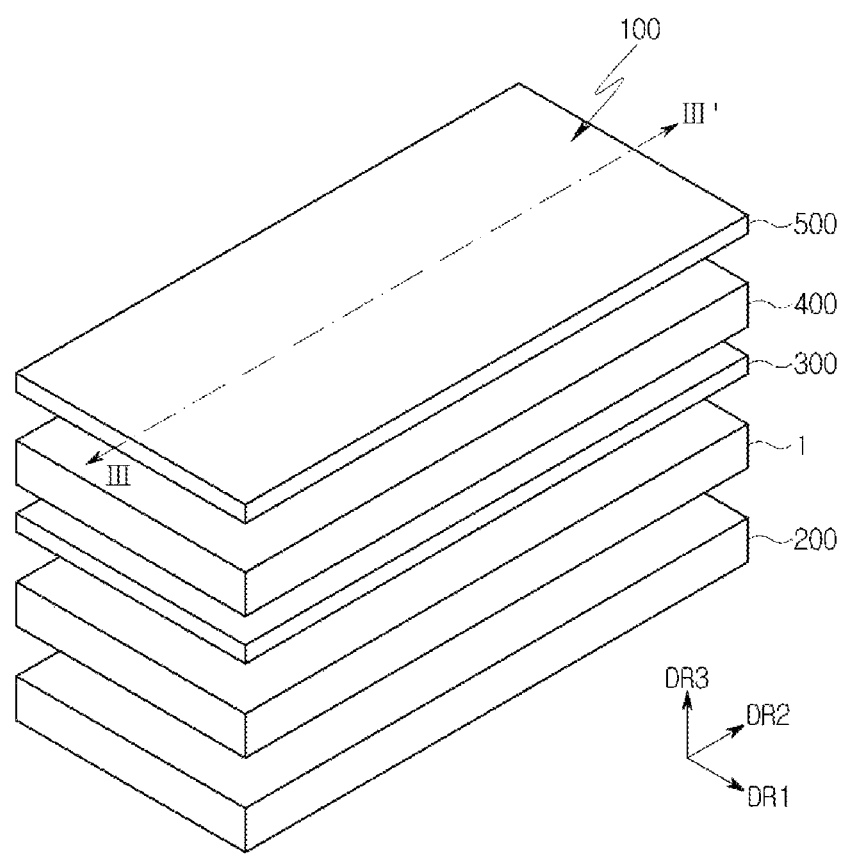
FIG. 22 is a perspective view of a display device according to an aspect.
Figure 23:
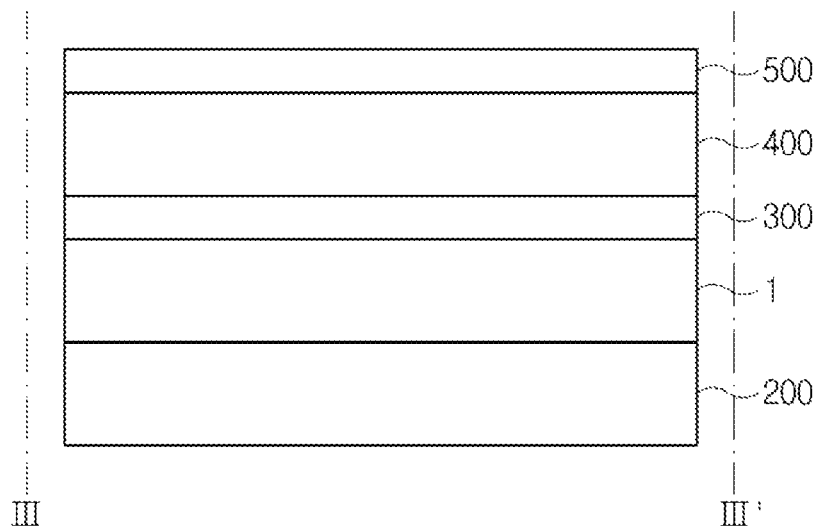
FIG. 23 is a cross-sectional view taken along line III-III' in FIG. 22.
Figure 23:

FIG. 22 is a perspective view of a display device according to an aspect of the disclosure. FIG. 23 is a cross-sectional view of the display device taken along line III-III' in FIG. 22.

Referring to FIGS. 22 and 23, a display device 100 according to an aspect may include a backlight unit 200 disposed on a lower part of the light path control member 1 and provides light to the light path control member 1, the first polarization film 300 on the light path control member 1, a display panel 400 on the first polarization film 300, and a second polarization film 500 on the display panel 400. A separate coupling member may be disposed between adjacent members 1, 300, 400, and 500 to couple each member. The coupling member may include a light transparent adhesive (OCA), a light transparent resin (OCR), or the like, but is not limited thereto.

The backlight unit 200 may be a direct-type backlight unit. The backlight unit 200 may be disposed under the display panel 400 to provide light to the display panel 400. In the process of providing light from the backlight unit 200 to the display panel 400, the corresponding light may be provided to the light path control member 1 and the first polarization film 300.

The first polarization film 300 is disposed on the light path control member 1 and may include a first phase delay layer, a second phase delay layer disposed to cover the first phase delay layer, and a first polarization layer on the second phase delay layer.

The first delay layer may delay incident light by a phase of ¼ wavelength ($\lambda/4$), and the second delay layer may delay incident light by a phase of ½ wavelength ($\lambda/2$).

The first polarization layer may be a linear polarization layer and may transmit light parallel to a light transmission axis. That is, among the light passing through, light in a direction parallel to the polarization direction is passed, and light in a direction perpendicular to the polarization direction is blocked. An axis orthogonal to the light transmission axis may be the first absorption axis X1 described above with reference to FIG. 8.

The first polarization layer may have a linear polarization function by using a polarization film. A non-limiting example of the polarization layer may include a polyvinyl alcohol (PVA) film.

The display panel 400 may be configured to display images. The display panel 400 may include a lower display panel, an upper display panel facing the lower display panel, and a liquid crystal layer interposed therebetween. That is, the display panel 400 may be a liquid crystal panel. The display panel 400 may be connected to a plurality of scan lines and a plurality of data lines. Also, the display panel 400 may include a plurality of pixel units connected to one of the plurality of scan lines and one of the plurality of data lines. The plurality of scan lines, the plurality of data lines, and the plurality of pixel units may be formed on the lower display panel of the display panel 400, and the respective lines may be insulated from each other.

The second polarization film 500 may be disposed on the display panel 400.

The second polarization film 500 may include a third delay layer, a fourth delay layer disposed to cover the third delay layer, and a second polarization layer on the fourth delay layer.

The third delay layer may delay incident light by a phase of ¼ wavelength ($\lambda/4$), and the fourth delay layer may delay incident light by a phase of ½ wavelength ($\lambda/2$).

The second polarization layer may be a linear polarization layer and may transmit light parallel to a light transmission axis. That is, among the light passing through, light in a direction parallel to the polarization direction is passed, and light in a direction perpendicular to the polarization direction is blocked. An axis orthogonal to the light transmission axis, that is, a light absorption axis may be in a direction orthogonal to the absorption axis X1 of the first polarization film 300.

The second polarization layer may have a linear polarization function by using a polarization film. A non-limiting example of the polarization layer may include a polyvinyl alcohol (PVA) film.

Figure 24:
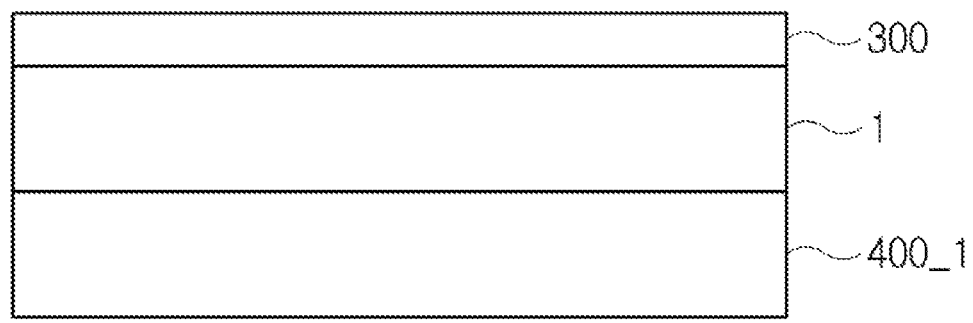
FIG. 24 is a cross-sectional view of a display device according to another aspect.
Figure 24:

FIG. 24 is a cross-sectional view of a display device according to another aspect of the disclosure.

Referring to FIG. 24, a display device 100_1 according to the present aspect is different from the display device 100 in FIG. 23 in that the backlight unit 200 and the second polarization film 500 are omitted.

A display panel 400_1 of the display device 100_1 according to the present aspect may be an organic light emitting display panel.

The display panel 400_1 may include a plurality of pixels disposed in a display area of a base substrate and driving units disposed in a non-display area around the display area to drive the pixels. The pixels may include transistors (TFTs) connected to the driving units through a control signal line, and organic light-emitting diodes (OLEDs) connected to the transistors. The transistors are turned on or off according to a control signal applied through the control signal line to adjust the amount of current applied to the light-emitting element. The light-emitting element may emit light with a luminance corresponding to the amount of current applied through the transistor.

Although the embodiments of the disclosure have been described above with reference to the accompanying drawings, it will be understood that the technical configuration of the present disclosure may be embodied in other specific forms by those skilled in the art to which the disclosure pertains without changing the technical spirit or essential features of the disclosure. Therefore, it should be understood that the embodiments described above are illustrative in all respects and not restrictive.

What is claimed is:

1. A light path control member comprising:
a first substrate;
a first electrode disposed on the first substrate;
a light path control unit disposed on the first electrode;
a second electrode disposed on the light path control unit; and
a second substrate disposed on the second electrode,
wherein the light path control unit includes a light transmission part and a light path conversion part around the light transmission part,
wherein the light transmission part includes first alignment materials,
wherein the light path conversion part includes second alignment materials,
wherein an alignment direction of the second alignment materials change according to a voltage applied to at least one of the first electrode or the second electrode,
wherein the light path conversion part changes a path of light provided according to the alignment direction of the second alignment materials,
wherein the second alignment materials are aligned in a thickness direction in a first mode in which the voltage is applied,
wherein in the first mode, the light is emitted in a front direction and a horizontal direction, and the light is blocked in a vertical direction,
wherein the second alignment materials are aligned in a first direction on a plane in a second mode in which the voltage is applied, and
wherein the first direction corresponds to a lengthwise axis of the light path conversion part.

2. The light path control member of claim 1, wherein in the second mode, the light is blocked in each of the front direction, the horizontal direction, and the vertical direction.

3. The light path control member of claim 2, wherein, in the first mode and the second mode, the first alignment materials are aligned in the thickness direction, respectively.

4. The light path control member of claim 3, wherein the first alignment materials are cured.

5. The light path control member of claim 1, wherein the first alignment materials and the second alignment materials include the same material.

6. The light path control member of claim 1, wherein the second electrode comprises a plurality of second electrodes, the light path conversion part comprises a plurality of light path conversion parts, and each of the plurality of second electrodes overlaps a corresponding light path conversion part, and
wherein the first electrode comprises a plurality of first electrodes, the light path conversion part comprises a plurality of light path conversion parts, and each of the plurality of first electrodes overlaps a corresponding light path conversion part.

7. The display device of claim 1, wherein the light path conversion part is configured to block more light in a first direction and pass more light in a second direction that is opposite of the first direction based on the alignment direction of the second alignment materials.

8. The display device of claim 7, wherein the light path conversion part includes a shape having a first interface region that receives light in the first direction and a second interface region that receives light in the second direction, wherein the second interface region has a larger surface area than the first interface region, wherein the first interface region and the second interface region each contact one of the first electrode and the second electrode.

9. A light path control member comprising:
a first substrate;
a first electrode disposed on the first substrate;
a light path control unit disposed on the first electrode;
a second electrode disposed on the light path control unit; and
a second substrate disposed on the second electrode,
wherein the light path control unit includes a first area and a second area around the first area,
wherein the first area includes a light transmission part,
wherein the second area includes a light transmission part and a light path conversion part around the light transmission part,
wherein the light transmission part includes first alignment materials,
wherein the light path conversion part includes second alignment materials,
wherein the second alignment materials change an alignment direction according to a voltage applied to at least one of the first electrode or the second electrode,
wherein the second alignment materials are aligned in a thickness direction in a first mode when the voltage is not applied, and the second alignment materials are aligned in a vertical direction on a plane in a second mode when the voltage is applied, and wherein, in the first mode and the second mode, the first alignment materials are aligned in the thickness direction, respectively.

10. The light path control member of claim 9, wherein the first alignment materials are cured.

11. The light path control member of claim 9, wherein the first electrode and the second electrode do not overlap the first area, respectively.

12. The light path control member of claim 11, wherein a curing degree of the second alignment materials in the second area is greater than a curing degree of the first alignment materials in the first area.

13. A display device, comprising:
a light path control member;
a first polarization film on the light path control member; and
a display panel on the first polarization film,
wherein the light path control member comprises:
a first substrate,
a first electrode disposed on the first substrate,
a light path control unit disposed on the first electrode,
a second electrode disposed on the light path control unit, and
a second substrate disposed on the second electrode, wherein the light path control unit includes a light transmission part and a light path conversion part around the light transmission part,
wherein the light transmission part includes first alignment materials,
wherein the light path conversion part includes second alignment materials, and
wherein an alignment direction of the second alignment materials change according to a voltage applied to at least one of the first electrode or the second electrode.

14. The display device of claim 13, wherein the light path conversion part changes a path of light provided according to the alignment direction of the second alignment materials.

15. The display device of claim 14, wherein the second alignment materials are aligned in a thickness direction in a first mode when the voltage is not applied, and the second alignment materials are aligned in a first direction on a plane in a second mode when the voltage is applied.

16. The display device of claim 15, wherein the first direction corresponds to a lengthwise axis of the light path conversion part, and an absorption axis of the first polarization film extends along a second direction crossing the first direction.

* * * * *